Patented June 1, 1948

2,442,588

UNITED STATES PATENT OFFICE 2,442,588

COPOLYMER OF ACRYLATE ESTER, ACRYLONITRILE, AND A DIENE-1,3

Gaetano F. D'Alelio, Pittsfield, Mass., assignor to General Electric Company, a corporation of New York No Drawing. Application September 17, 1942, Serial No. 458,726

1 Claim. (Cl. 260—84.5)

The present invention relates to new synthetic resinous compositions and more particularly to potentially reactive (i. e., heat-convertible or vulcanizable), flexible and elastic compositions which possess both the properties of flexible thermoplastic resins and the elasticity and heat-convertibility of the natural and synthetic rubbers. Specifically, this invention is concerned with the production of compositions containing polymerization products of a mixture of the following polymerizable components: (1) acrylonitrile, (2) at least one acrylic acid ester of the formula

where Z is a radical of a monohydric alcohol, e. g., methyl, ethyl, phenyl, etc., and (3) at least one diene-1,3 of the formula

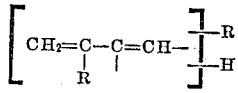

where R is a member of the class consisting of hydrogen and the methyl radical, the limits of the polymerizable components used being within the range hereinafter specified.

It has heretofore been known that in the preparation of the so-called synthetic rubbers, the diene component, e. g., butadiene comprised at least fifty and as much as seventy to eighty per cent of the polymerizable mass, and that the remaining component was either styrene or acrylonitrile. Furthermore, the high concentration of butadiene was required to give the synthetic rubber a certain degree of flexibility and elasticity and to impart other properties similar to rubber.

I have now discovered that valuable advantages can be gained by the production of synthetic resinous compositions of the present invention. Primarily, in accordance with my invention, the amount of butadiene required as compared to that required in conventional synthetic rubber production is considerably reduced and the acrylic acid ester component contributes other desirable properties to the finished product. Furthermore, acrylic acid esters are readily derivable from agricultural products. For example, lactic acid and its esters, which may be prepared from dextrose bodies such as the natural occurring dextrose substances which are present in skim milk, corn syrup and sugar, strap molasses, etc., can be dehydrated to yield the corresponding acrylate derivatives, thus contributing to an agricultural economy.

Another advantage accrues from the practice of my invention. The vulcanizable resinous compositions of my invention may be prepared in a much shorter time than that required for the conventional synthetic rubbers, that is, the butadiene-styrene or the butadiene-acrylonitrile compositions. Within the range of compositions used in the practice of my invention, low pressure equipment is satisfactory for the process, and the yield of the tripolymer is high within a reasonable reaction time. Thus, in the system butadiene, acrylonitrile, ethyl acrylate, the acrylate apparently acts as an accelerator of polymerization since only thirty per cent or less of the normal time is required to complete the polymerization as compared to a system from which the acrylate is omitted. Since a high conversion of the polymerizable mass occurs within a reasonable time in the practice of this invention, no complicated or expensive recovery system is required for the unconverted butadiene as now found in the conventional synthetic rubber plants. Too, since the butadiene used in preparing the compositions of this invention is in the minor proportion, in the unvulcanized or unconverted state, these compositions find utility as thermoplastic resins. The convertible and vulcanizable compositions of this invention likewise have greater utility than either the natural or conventional synthetic rubbers. The presence of the ester groups permits the compatibility of these compositions with numerous resinous and synthetic bodies, not normally compatible with rubber-like bodies. The presence of an ester group, a hydrocarbon group, and a nitrile group permits a wide range of plasticizers, extenders and other modifiers, to be incorporated into the polymerized mass.

A further advantage resulting from the practice of my invention is the resistance to atmospheric attack of the tripolymer. Ordinary soft rubbers are obtained by vulcanizing only a fraction of the double bonds present in the elastomer. This process leaves behind many double bonds which are sources of attack from oxygen, ozone, hydrogen sulfide, etc. The addition of antioxidants retards this effect but does not eliminate it. Because of this, industrial rubber products have a limited life. According to the present invention, the number of double bonds present from the butadiene is relatively small. These bonds may be completely saturated by vulcanization, thus removing the possibility of future oxidation or attack by other active materials, and at the same time due to the presence of the acrylic ester, permitting the product to retain its elastomeric characteristics.

Many natural and synthetic rubbers and rubber substitutes today, although satisfactory in many respects, are limited in application because of their poor stability toward oils and solvents. I have found that in addition to the many desirable features possessed by the resins of this invention, they also have an extremely high resistance to oils and solvents, especially when the resins are vulcanized and filled with carbon black or other reinforcing agents. This resistance to oils and solvents makes these resins applicable in such uses as linings for gas tanks, diaphragms, gaskets, etc.

Although this feature is desirable in a great variety of cases, nevertheless, there are certain other applications wherein solubility is useful. It is therefore interesting to note that a very limited selected number of solvents are capable of dissolving the unvulcanized resins herein described. For example, such solvents as orthochloro phenol, alpha, beta-dichloropropionitrile, nitrobenzene and nitrobutane are satisfactory for this resin and may be used in preparing coating compositions which may be vulcanized by heat treatment or other means after application to the desired surface.

The polymerizable components used in the practice of this invention may be varied within the following limits depending on the nature of the product desired.

| Percent by Weight | Polymerizable Component |
|---|---|
| 25-65 | Acrylonitrile |
| 65-25 | Acrylic acid ester |
| 1.75-30 | Diene-1,3 |

For the production of synthetic compositions most closely resembling rubber the preferred range of polymerizable components is:

| Percent by Weight | Polymerizable Component |
|---|---|
| 25-40 | Acrylonitrile |
| 40-55 | Acrylic acid ester |
| 15-25 | Diene-1,3 |

Such compositions possess elasticity and extensibility together with rapid recovery following the release of the deformation forces. In addition, the strength and toughness characterized by these compositions compare very favorably with other synthetic and natural rubbers. The oil and solvent resistance is greatly enhanced by the presence of the acrylonitrile within the ranges specified. The diene component permits very satisfactory vulcanization with resultant reduction in cold flow properties. Likewise, such vulcanized products may be removed from the mold while hot, thus reducing operating costs.

The term acrylonitrile refers to the compound $CH_2=CHCN$.

Nitrile derivatives of unsaturated aliphatic acids, other than acrylonitrile, are not satisfactory in producing the resin bodies of this invention. For instance, when methacrylonitrile is used the polymerization is retarded so much that it would not be feasible economically to prepare a polymerization product using this component.

The term diene-1,3 includes the hydrocarbon materials of the formula

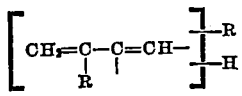

wherein R is a member of the class consisting of hydrogen and the methyl radical. It is apparent from an inspection of the above formula that the term diene-1,3 includes the butadienes-1,3 of the formula

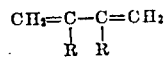

where R has the meaning above given, and the pentadienes-1,3 of the formula

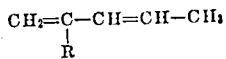

where R has the meaning above given. Pentadienes of this formula have higher boiling points, for example 2-methyl pentadiene-1,3,

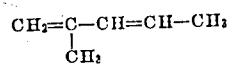

boils at approximately 70° C. as compared with butadiene which boils at −3° C. The higher boiling point of the pentadiene permits the use of less expensive manufacturing equipment.

As pointed out above the acrylic acid ester component is represented by the structure $CH_2=CHCOO-Z$ where Z is the radical of a monohydric alcohol, for example, methyl, ethyl, propyl, butyl, amyl, hexyl, phenyl, chlorophenyl, cresyl, cyclohexyl, naphthyl, phenethyl, phenoxyethyl, phenoxypropyl, nitromethyl, nitrophenyl, nitroethyl, chloroethyl, etc., preferably a lower alkyl type radical, having less than ten carbon atoms, such as methyl, ethyl, propyl, butyl, benzyl, phenethyl, etc., for reasons of economy.

I have discovered that the inclusion of as little as 1.75% of diene component is sufficient to change the character of the copolymer of acrylonitrile and acrylic ester. When a composition of this type is vulcanized there is a notable improvement in the cold flow properties as compared to a resin made from mono-vinyl aryl compound and acrylic ester alone. The former will retain its shape under moderate stresses and temperatures from about 80 to 100° C. or higher whereas the latter will not retain its shape at such elevated temperatures even without stress. This resistance to cold flow and low temperature flow is important in certain industrial applications.

The polymerizable compositions of this invention may be polymerized in mass or in emulsion form to give a latex type body or in dispersion form to give granulated products, depending on the product desired and the application for which it is intended. The emulsions or dispersions are preferably prepared in a water medium under the influence of appropriate dispersion or emulsifying agents, e. g., the water soluble soaps, polyvinyl alcohol, polyacrylic acid, polymethacrylic acid, the water soluble salts of polymerized methylene polycarboxylic acids, the water soluble salts of the styrene-maleic anhydride copolymers disclosed and claimed in my copending application, now abandoned, Serial No. 449,677, filed July 3, 1942 and assigned to the same assignee as the present invention, the water soluble salts of the sulfosuccinic esters, etc.

Any suitable method may be used in preparing the polymerizable compositions of this invention. For example, the polymerizable components may be polymerized in the presence or absence of a solvent or a dispersion medium for the monomers by the use of heat, light, or heat and light in the presence or absence of a polymerization catalyst, at atmospheric, subatmospheric or superatmospheric pressure.

Suitable catalysts are the peroxides, e. g., benzoyl peroxide, sodium peroxide, hydrogen peroxide, acetyl benzoyl peroxide, etc.; the per-compounds, e. g., ammonium persulfate, sodium persulfate, sodium perchlorate, sodium perborate, potassium persulfate, etc.; ozone; ozonides; etc. Additional examples of polymerization catalysts that may be used are found in my U. S. Patent 2,260,005, issued October 21, 1941, and assigned to the same assignee as the present invention.

Instead of starting with monomeric materials, I may start with partially polymerized materials or with mixtures of monomeric and partially polymerized materials.

The following examples are given to illustrate how this invention is carried into effect:

In the examples the term "vulcanizer," except where otherwise stated, refers to a composition of the following type:

| | Parts by weight |
|---|---|
| Benzothiazyl disulfide | 100 |
| Phenyl beta-naphthylamine | 100 |
| Stearic acid | 100 |
| Zinc oxide | 500 |
| Sulfur | 200 |

*Example 1*

In the trimeric system acrylonitrile, an acrylic acid ester and a butadiene-1,3 bounded by the limits of the present invention, I have found that when the butadiene is kept below 25% of the whole, the polymerization proceeds at a rate very much quicker than compositions wherein the butadiene is high and the acrylic acid ester absent. The following table illustrates this point:

| Ex. | Butadiene-1,3 | Ethyl Acrylate | Acrylonitrile | Hours at Temperature, °C. | | | Yield |
|---|---|---|---|---|---|---|---|
| | | | | 53 | 60-65 | 70-75 | |
| | | | | | | | Per cent |
| A | 10 | 65 | 35 | | | 11 | 86 |
| B | 20 | 65 | 35 | | | 9 | 77 |
| C | 46.7 | | 35 | | | 14 | 76 |
| D | 40 | 65 | 20 | 290 | 72 | 24 | ¹72 |
| E | 46.7 | | 35 | | | 44 | 59 |
| | | | 20 | | | 16 | ²15 |

¹ 170 hours at 20°.
² 1224 hours at 20°.

In Examples A, B and D, 0.5 part of benzoyl peroxide was used or less than ½% on the basis of the polymerizable monomers whereas over 1% of benzoyl peroxide was used in Examples C and E. It is to be noted that even if the acrylic acid ester is present and the butadiene-1,3 component comprises more than 25% of the whole (see above "D") the rate at which the polymerization advances is extremely slow.

In the above Examples "A," "B," "D" and "E," the monomeric constituents were placed in autoclaves together with an aqueous solution of a dispersion agent (dioctyl ester of sodium salt of sulfosuccinic acid).. The vessels were sealed and heated at the temperature and for the time indicated. In Example "C," the aqueous solution of a dispersion agent was omitted. This, however, does not account for the tremendous increase in time required to polymerize this mixture. In Example "E," the tubes were kept at room temperature exposed to sunlight for 1224 hours.

*Example 2*

| | Parts by weight |
|---|---|
| Ethyl acrylate | 65 |
| Acrylonitrile | 35 |
| Butadiene | 2 |
| 3% aqueous solution of dioctyl ester of sodium salt of sulfosuccinic acid | 210 |
| Benzoyl peroxide | 0.015 |

The above ingredients were sealed in an autoclave and placed in a steam bath at 65° C. for 15 hours. The polymer was removed, washed, dried and sheeted.

*Example 3*

| | Parts by weight |
|---|---|
| Ethyl acrylate | 1300 |
| Acrylonitrile | 700 |
| Benzoyl peroxide | 4 |

The above ingredients were mixed together in a suitable vessel fitted with a reflux condenser and a stirrer. The contents were heated in a steam bath for 1½ hours gradually raising the temperature from 40° to 68° C. Fifteen minutes after the maximum temperature was reached, 10,000 parts by weight of 1% polyvinyl alcohol dissolved in water were added. By means of rapid agitation the copolymer was dispersed in the polyvinyl alcohol solution and in this form the contents of the vessel were heated at 70° C. for forty hours, 75° C. for five hours and 85°-90° C. for three hours. The dispersed copolymer was cooled and the agitation stopped, the bead-like copolymer was filtered off, and washed well with water. The copolymeric composition was then dried at 70-75° C. and sheeted on the milling rolls to a thickness of approximately 25 mils.

*Example 4*

| | Parts by weight |
|---|---|
| Tripolymer of Example 2 | 100 |
| Vulcanizer | 3 |

The above ingredients were milled together on cold rolls until a homogeneous product was obtained. A portion of this was then pressed between platens at 120° C. for 30 minutes. A sheet of approximately 1/16 inch thick was obtained.

*Example 5*

A sample of the copolymer in Example 3 was pressed between platens to a thickness of 1/16 inch. A piece was now cut to a size identical to that of a vulcanized sample of Example 4 (½ inch by 1 inch). These two samples were now placed in an oven at 110° C. The sample of Example 3 was removed after 10 minutes. The surface was creped and the mass now measured approximately ¼" x ½" x ⅛". This unmodified resin was thermoplastic. After 48 hours, the sample of Example 4 was removed and found to be unchanged. It had maintained its shape during exposure to the elevated temperature. This was definite indication that vulcanization had occurred.

*Example 6*

| Example | Acrylonitrile | Butadiene | Ethyl Acrylate | Benzoyl Peroxide | 3% Aqueous Dioctyl Ester of Sodium Salt of Sulfosuccinic Acid |
|---|---|---|---|---|---|
| A | 35 | 5 | 65 | 0.15 | 200 |
| B | 35 | 20 | 65 | 0.15 | 180 |
| C | 35 | 30 | 65 | 0.15 | 180 |

Each composition above was placed in an autoclave and sealed. The polymerization was carried out using the following temperatures for the times indicated.

| | Time for Given Temperatures (° C.) in Hours | | |
|---|---|---|---|
| | 65° | 75° | 95° |
| A | 24 | 116 | 4 |
| B | 24 | 116 | 8 |
| C | 26 | 44 | |

At the end of the indicated period the polymer was removed, washed and sheeted to a homogeneous product.

Example 7

| | Parts by weight |
|---|---|
| Tripolymer of Example 6A | 100 |
| Vulcanizer | 5 |

Example 8

| | Parts by weight |
|---|---|
| Tripolymer of Example 6B | 100 |
| Vulcanizer | 5 |

Example 9

| | Parts by weight |
|---|---|
| Tripolymer of Example 6C | 100 |
| Vulcanizer | 5 |

Each of the ingredients of Examples 7, 8 and 9 were mixed separately and milled until homogeneous products were obtained. The products were cured for 30 minutes at 160° C. Each sample was tested before and after to determine the tensile strength of the unvulcanized and vulcanized sheets.

In each case the vulcanized sample showed a higher tensile strength than the unvulcanized piece, as is indicated by the following values for Example 7.

| | Vulcanized | Unvulcanized |
|---|---|---|
| Example 7 | 1,740 | 194 |

Example 10

| Example | Acrylonitrile | Butadiene | Ethyl Acrylate | Benzoyl Peroxide | Hours at ° C. | |
|---|---|---|---|---|---|---|
| | | | | | 65° | 75° |
| A | 35 | 2 | 65 | 0.15 | 26 | 44 |
| B | 35 | 10 | 65 | 0.15 | 26 | 44 |

Each of the above mixtures was placed individually in an autoclave and heated at the temperature indicated for the time indicated. The polymerized masses were removed, washed, dried and sheeted. As in Examples 7, 8 and 9, the products of this example were vulcanized. Tensile strengths before and after afforded a satisfactory means for determining whether the composition had been vulcanized.

| Example | Vulcanized | Unvulcanized |
|---|---|---|
| A | 1950 | 372 |
| B | 1000 | 350 |

Example 11

| | Parts by weight |
|---|---|
| Benzyl acrylate (partially polymerized to a moderately viscous liquid) | 65 |
| Acrylonitrile | 36 |
| Butadiene | 13.5 |
| Benzoyl peroxide | 1.0 |

The above ingredients were mixed together in an autoclave which was sealed and then heated to 70–72° C. for 48 hours, although the polymerization was substantially complete after 6 hours. It was tack-free, moderately strong, had very good flexibility and recovery after deformation.

Example 12

| | Parts by weight |
|---|---|
| Benzyl acrylate (partially polymerized) | 30 |
| Ethyl acrylate | 47 |
| Acrylonitrile | 37 |
| Butadiene | 10 |
| Benzoyl peroxide | 1 |

These components were treated as above. The strength of the piece was remarkably high even in the unvulcanized state.

Example 13

| | Parts by weight |
|---|---|
| Tripolymer of Example 11 | 90 |
| Vulcanizer | 4.5 |

The above ingredients were milled together on cold rolls until a homogeneous product was obtained. This was then pressed between platens at 145° C. for 15 minutes. The thin sheet of polymer had excellent plasticity, flexibility, pliability and extensibility with immediate recovery following deformation.

Example 14

| | Parts by weight |
|---|---|
| Tetrapolymer of Example 12 | 100 |
| Vulcanizer | 5 |

These ingredients were treated in the same manner as those of Example 13. The only noticeable difference between the two samples was in their strength. The tetrapolymer of this example possessed a much greater tensile strength than did the tripolymer in the previous example.

The remaining examples were all carried out with the resinous condensation products prepared in the three following Examples 15, 16 and 17.

Example 15

| | Parts by weight |
|---|---|
| Acrylonitrile | 255 |
| Ethyl acrylate | 474 |
| Butadiene | 84 |
| 3% aqueous dioctyl ester of sodium salt of sulfosuccinic acid | 1200 |
| Benzoyl peroxide | 4.0 |

The above ingredients were introduced into an autoclave fitted with a stirrer and a suitable temperature control. The autoclave was sealed and run under constant stirring. The temperature was raised slowly to 75–80° within an hour and kept there for an additional hour, then at 85–90° C. for 6 hours and at 110° for ½ hour. No pressure, other than the steam pressure expected, was noticed during the last 6½ hours of polymerization. The polymerized mixture consisted largely of latex containing 30.4% resin solids. The yield of washed and dried polymer after coagulation with acid and heat and being combined with the polymer not in latex form was substantially quantitative. The polymer was sheeted to a thickness of approximately 100 mils. It was transparent, flexible, difficultly extensible and very strong.

Example 16

| | Parts by weight |
|---|---|
| Acrylonitrile | 255 |
| Ethyl acrylate | 474 |
| Butadiene | 181 |
| 2% aqueous dioctyl ester of sodium salt of sulfosuccinic acid | 2000 |
| Benzoyl peroxide | 4.6 |

The above ingredients were sealed in an autoclave as in the preceding example. The temperature was raised slowly from 15° C. to 58° C. The pressure within the autoclave increased from atmospheric to 35–40 pounds per square inch, and the reaction allowed to proceed overnight at between 41 to 58° C. The temperature was raised for a very short time to 80° C. and no pressure was registered indicating that the reaction had gone to completion. Granulated resin and latex were obtained. The latex which contained approximately 14% solids content was precipitated. The isolated mass was thoroughly washed and dried and sheeted on the milling rolls to a product of 100 mils in thickness. The sheeted polymer was much more flexible than the product of the preceding example. It possessed much greater extensibility.

Example 17

| | Parts by weight |
|---|---|
| Acrylonitrile | 255 |
| Ethyl acrylate | 480 |
| Butadiene | 197 |
| 0.3% aqueous solution of the disodium salt of a styrene-maleic anhydride copolymer | 2000 |
| Benzoyl peroxide | 4.5 |

The above ingredients were sealed within an autoclave in the same manner as those of the two preceding examples. The temperature was maintained at 80° C. for 16 hours, at the end of which time the polymerized product was removed. The latex contained only 1.25% of resin solids. The majority of the resin was irregularly shaped, bead-like particles. The latex was precipitated in the usual manner and washed and dried together with the remaining polymer. The product was then sheeted to a convenient size and used in this fashion.

Example 18

The polymer of Example 15 was divided into several samples. Each was treated with vulcanizer or with some modifying material and then vulcanized as indicated in the following table:

| Ex. | Polymer | Reclaim Rubber | Carbon Black | Plasticizer | Vulcanizer | Temperature °C. | Pressure Lbs. per sq. in. | Time Minutes |
|---|---|---|---|---|---|---|---|---|
| A | 50 | | | | 1.6 | 155 | 700 | 15 |
| B | 50 | | | | 2.5 | 150 | 600 | 20 |
| C | 50 | | 25 | | 2.5 | 155 | 700 | 15 |
| D | 50 | | 25 | 2.5 | 2.5 | 155 | 700 | 15 |
| E | 50 | | | 2.5 | 2.5 | 155 | 700 | 15 |
| F | 50 | 50 | 50 | | 2.5 | 155 | 700 | 15 |
| G | 50 | | 25 | | 0.75 | 130 | 600 | 10 |
| H | 40 | | | | 1.6 | 150 | | 10 |

In each case the components were milled together on chilled rolls until a homogeneous product was obtained. The order of addition of components followed the listing order as above. To show that the products were vulcanized, several were removed from the mold while still hot. For example: "A" at 110° C., "B" at 150° C., "C" at 155° C., "H" at 150° C. In each case the vulcanized product was examined. The following results were noted.

"A"—The vulcanizer in this example was different from the usual type used. It consisted of:

| | Parts by weight |
|---|---|
| Zinc oxide | 10 |
| Benzothiazyl disulfide | 2 |
| Di-(ortho-tolyl) guanidine | 2 |
| Sulfur | 2 |

The product of vulcanization was much less flexible and more rigid (although it was still capable of being creased) than any of the other products made including subsequent examples.

"B"—The pressed sheet was homogeneous and smooth. It showed good flexibility and moderate recovery. The product was a light yellow in color.

"C"—The pressed sheet was extremely tough, flexible, extensible with good recovery.

"D"—This product was similar to "C" but possessed slightly greater flexibility. It had good extensibility with substantially 100% recovery following deformation. The tensile strength was 2200 pounds per square inch. This was an exceptional value for so pliable a material.

"E"—This product was identical with "B" above but exhibited slightly greater flexibility.

"F"—This product indicates the versatility of the copolymers of this invention. They may be used to improve certain inferior industrial products. The product was very strong possessing a tensile strength of 1940 pounds per square inch. The vulcanized material was tough, easily flexible, glossy, smooth, and generally excellent.

"G"—In addition to sulfur as a vulcanizing agent, other materials may be used. Tuads (tetramethyl-thiuram-disulfide) for instance was used in this example. The vulcanized product possessed good strength and flexibility.

"H"—The vulcanizer used here was:

| | Parts by weight |
|---|---|
| Benzoquinone dioxime | 0.8 |
| Lead oxide | 0.8 |

The vulcanized product showed good flexibility and extensibility with 100% recovery following deformation. The tensile strength of this sample was in excess of 1220 pounds per square inch.

The carbon black used in this example was a channel carbon black. The plasticizer used was triethylene glycol di-(2-ethyl butyrate).

Example 19

This example was carried out in a manner similar to that of Example 18. However, in place of the tripolymer of Example 15, the tripolymer of Example 16 was used.

| Example | A | B | C | D | E | F | G | H |
|---|---|---|---|---|---|---|---|---|
| Tripolymer | 25 | 50 | 50 | 50 | 50 | 50 | 50 | 50 |
| Reclaim Rubber | | | | | | 50 | | |
| Resin | | | | | | | | |
| Whiting | | | | 30 | | | 50 | |
| Catalpo Clay | | | | 23 | | | | |
| Carbon Black | | 25 | 25 | | | 50 | 50 | |
| Plasticizer | | | 2.5 | 3.0 | 2.5 | | | |
| Vulcanizer | 1.21 | 2.50 | 2.50 | 6.30 | 2.5 | 5.0 | 2.5 | 1.25 |
| Temperature, °C. | 155 | 155 | 155 | 155 | 155 | 155 | 155 | 155 |
| Pressure, lbs. per sq. in. | 600 | 700 | 700 | 700 | 700 | 600 | 600 | 700 |
| Time, Min. | 10 | 15 | 15 | 15 | 15 | 15 | 15 | 15 |

In each of the above examples, the tripolymer was milled on cold rolls. The addition of the remaining ingredients followed in the order listed. A homogeneous product was obtained in each case which was then pressed as indicated to obtain a vulcanized sheet. The results of this series is indicated below.

"A"—The vulcanized product possessed excellent flexibility and good strength for a non-reinforced resin. It was easily extensible with complete recovery following deformation. The resin was light in color.

"B"—In order to show that this product had been vulcanized, it was removed from the mold at 155° C. The sheet was very strong, easily flexible and extensible with good recovery following deformation.

"C"—This example yielded a product very much the same as in "B" although a slight increase in ease of flexibility and extensibility was noted.

"D"—In this example a slightly different type filler and vulcanizer were used. The vulcanized sheet was somewhat softer than preceding products and much lighter in color. The cream colored sheet showed good strength but somewhat less flexibility and extensibility than in previous examples, although these characteristics were still satisfactory. The recovery following deformation was excellent. The vulcanizer used in the present example had a formulation as follows:

| | Parts by weight |
|---|---|
| Mercaptobenzothiazole | 1.5 |
| Zinc laurate | 1.5 |
| Phenyl beta-naphthylamine | 1.5 |
| Sulfur | 1.5 |
| Tetramethyl-thiuram-disulfide | 0.3 |

"E"—This example was very similar to that in "A." However, it possessed somewhat greater plasticity. The vulcanized product was especially suited for diaphragms and other thin sheetlike products.

"F"—The vulcanized product was removed from the mold at 155° C. It was well cured and possessed a smooth, tack-free surface. The material was strong, having a tensile strength of 1440 pounds or more per square inch and at the same time showing good flexibility and extensibility with quick recovery following deformation.

"G"—This product was also removed from the mold while still hot. It was much tougher and less flexible and extensible than preceding examples. The vulcanized product resembled a moderately hard rubber in appearance.

"H"—This product was prepared using a vulcanizer of the following composition:

| | Parts by weight |
|---|---|
| Benzothiazyl disulfide | 0.25 |
| Phenyl beta-naphthylamine | 0.25 |
| Stearic acid | 0.25 |
| Sulfur | 0.50 |

The product was similar to that of "A" however, due to the omission of zinc oxide, it was nearly black, but when held up to a light was noticeably translucent.

As in the preceding example, Micronex was used as the carbon black reinforcing agent and triethylene glycol di-(2-ethyl butyrate) as the plasticizer. The resin referred to was made in the same manner as described in Example 3 using 1200 parts ethyl acrylate and 800 parts of acrylonitrile in place of the quantities therein designated.

*Example 20*

This example was carried out in the same manner as the two preceding ones as indicated in the following table, using the tripolymer of Example 17.

| Ex. | Tripolymer | Reclaim Rubber | Carbon Black | Plasticizer | Vulcanizer | Temperature °C. | Pressure Lbs. per sq. in. | Time Minutes |
|---|---|---|---|---|---|---|---|---|
| A | 50 | | 25 | | 2.5 | 155 | 600 | 15 |
| B | 50 | | 25 | 2.5 | 2.5 | 155 | 600 | 15 |
| C | 50 | 50 | 50 | | 5.0 | 155 | 600 | 15 |
| D | 50 | | | | 1.25 | 155 | 600 | 15 |
| E | 50 | | 25 | | 1.5 | 170 | 700 | 10 |

In each of the above examples the tripolymer was milled on cold rolls. The addition of the remaining ingredients followed in the order listed. A homogeneous product was obtained in each case which was then pressed as indicated to obtain a vulcanized sheet. The results of this series are indicated below.

"A"—The vulcanized sheet possessed excellent flexibility and extensibility with quick recovery. It resembled a soft rubber and possessed excellent strength. The tensile strength for this sample was 2030 pounds per square inch.

"B"—The vulcanized sheet of this sample was similar to that in "A" with the exception that it possessed slightly greater flexibility and extensibility than the product of the preceding example.

"C"—The vulcanized product was removed from the mold while hot. This was evidence that curing had taken place. The tensile strength of the product was found to be 1465 pounds per square inch. The product was extremely flexible and stretchable with excellent recovery as in the preceding examples.

"D"—The vulcanizer used in this example was slightly different than usual. The composition used consisted of:

| | Parts by weight |
|---|---|
| Benzothiazyl disulfide | 0.25 |
| Phenyl beta-naphthylamine | 0.25 |
| Stearic acid | 0.25 |
| Sulfur | 0.50 |

The vulcanized product possessed good flexibility and extensibility with quick recovery.

"E"—This product was carried out using Tuads (tetramethyl thiuram disulfide) as the vulcanizer. After vulcanization, the product was removed from the mold while still hot. Examination showed a well cured, highly flexible, and extensible product possessing rapid recovery.

*Example 21*

| | Parts by weight |
|---|---|
| Ethyl acrylate | 400 |
| Acrylonitrile | 400 |
| Butadiene | 200 |
| Benzoyl peroxide | 5 |
| 0.1% aqueous solution of disodium salt of a styrene-maleic anhydride copolymer | 2000 |

The above ingredients were placed in an autoclave which was sealed to withstand the maximum pressure of the reaction. The polymerization was carried out at 65° C. for 40 hours under constant agitation. The contents were removed, washed and dried. The dried tripolymer was milled on the differential rolls until a homogeneous product of the desired thickness was obtained.

*Example 22*

| | Parts by weight |
|---|---|
| Tripolymer of Example 21 | 50 |
| Vulcanizer | 2.5 |

These were sheeted together on chilled rolls, and after homogeneity was obtained, pressed between platens at 145° C. for 10 minutes. The sheet was removed from the mold while still hot. It was very strong and possessed good flexibility and extensibility, with 100% recovery.

*Example 23*

| | Parts by weight |
|---|---|
| Tripolymer of Example 21 | 50 |
| Carbon black | 25 |
| Vulcanizer | 2.5 |

These ingredients were sheeted together on chilled rolls until a homogeneous product was obtained. The product was pressed between platens at 145° C. at 500 pounds per square inch for 20 minutes and removed from the mold while still hot. The tensile strength of the product was 1700 pounds per square inch. It was easily flexible and less easily extensible, but possessed good recovery following deformation.

*Example 24*

Two samples of resin, one unvulcanized from Example 15 and the other vulcanized from Example 18C, were placed in a series of solvents and allowed to remain in contact with the solvent for more than 7 days. At the end of this period the samples were examined. The vulcanized and unvulcanized resin resisted solvent attack in the following solvents:

Dilute acetic acid
Dilute sulfuric acid
Concentrated aqueous ammonia
Butyl alcohol
Benzene
Concentrated caustic solution
2-ethyl hexyl alcohol
Hydrazine hydrate
Turpentine
Naphtha
Petroleum ether
Liquid petrolatum
Castor oil The following solvents had no solvent action upon either the vulcanized or unvulcanized product other than a slight increase in plasticity:

Ethylene cyanohydrin
Ethyl alcohol
Xylene
Paraldehyde
Diethyl sulfate
Hydrochloric acid No solvent action was noticed on the vulcanized product with each of the following:

Aniline
Acetic anhydride
Anisole
Butyraldehyde
Acetophenone
Sulfuric acid
Ethyl acetate
Methyl ethyl ketone
Dioxane
Ethyl acetoacetate
Acetone
Acetic acid
Benzoyl chloride
Pyridine
Diethyl malonate
Nitrobutane Although in the above examples I have used butadiene-1,3 as the diene-1,3 component, other butadiene-1,3 compounds embraced by the formula

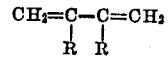

wherein R is a hydrogen or methyl radical, e. g., 2-methyl butadiene-1,3 and 2,3-dimethyl butadiene-1,3 may be used. Pentadiene-1,3 compounds of the formula

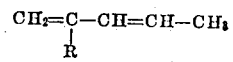

wherein R is a hydrogen or methyl radical, e. g., pentadiene-1,3 and 2-methyl pentadiene-1,3, likewise, may be used in place of the butadiene-1,3.

It is surprising that the compositions of the present invention can be readily prepared since numerous attempts have been made to prepare tripolymeric compositions possessing the properties of elasticity, recovery and vulcanizability or heat convertibility. Thus, when vinyl chloride is substituted for the acrylonitrile in the polymerizable composition of this invention in an effort to prepare a tripolymer of butadiene, vinyl chloride and ethyl acrylate, no tripolymer is formed. Similarly, no tripolymer or other useful product is obtained when the system butadiene, acrylonitrile and vinyl acetate is subjected to polymerizing influences.

Vulcanization may be accomplished through any of the numerous methods used to vulcanize natural, reclaim or synthetic rubber, such as by means of certain nitro compounds, benzoquinone dioxime, thiuram derivatives, sulfur, lead oxide, hexamethylene tetramine, the guanidines, e. g., diphenyl guanidine, salts of the thiuram derivatives, etc.

The heat convertible resins of this invention are compatible with numerous natural and synthetic bodies. For example, they are compatible with all types of reclaim rubber, natural rubber, the synthetic rubbers, such as the Buna N and the Buna S types, the butyl and the chloroprene types of rubbers. Among the other synthetic bodies, they may be compounded with polyalkene type of polymer, such as polythene, polyisobutylene, the polyalkylene sulfides and the like. By suitable processing, these resins are compatible with polystyrene, polystyrene copolymers with acrylic ester, with the methacrylic and acrylic acids and esters and copolymers, with the polyvinyl compounds, such as polyvinyl acetate, polyvinyl acetals, such as the formal, the acetal, the butyral, and the like, copolymers of vinyl halides with other vinyl and acrylic esters, plasticized polyvinyl chloride, cellulose acetate and the like. Mineral rubber (i. e., blown asphalt), cumar, indene and cumar-indene resins as well as factis are extremely compatible with the resins of this invention.

Another extremely unexpected feature of these resins is that they tolerate loading and filling extremely well and are actually reinforced by finely divided carbon blacks such as channel black.

Among the fillers and modifiers which may be added to these compositions may be mentioned channel black, zinc oxide, aluminum oxide, celite, wood flour, walnut shell flour, asbestos, leather scraps, silex, magnesium carbonate, mica, glass, fabric in continuous or shredded form, cellulosic products, calcium sulfate, lignin, lignocellulose, clay, whiting, ferrous oxide, ferric oxide, etc.

As lubricants, there may be used the free fatty acids, such as stearic and lauric acids, salts of fatty acids, such as the calcium zinc, tin, etc., salts of lauric, stearic, oleic, etc. acids.

As plasticizers, there may be used the phenyl, benzyl and phenethyl esters of polycarboxylic acid, e. g., the adipates, sebacates, phthalates; the ethers and esters of polyhydric alcohols, for example, esters and ethers of glycol, diethylene glycol, triethylene glycol, glycerine, diglycerine, etc., for example the acetates, propionates, butyrates, hexoates, benzoates, toluates; the mono and polycarboxylic esters of nitro alcohols, etc., the alkoxyaryl alkanes, e. g., beta, beta'-bis-(para-methoxy-phenyl) propane; ketones, e. g., acetophenone, isophorone, acetoacetic esters, etc.; esters of acetylated hydroxy acids, e. g., acetyl tributyl citrate, acetyl triethyl citrate, butyl acetyl ricinoleate, etc.; esters of hydroxy acids, dibutyl tartrate, etc.; esters of cyano alkanols, e. g., bis-(alpha-cyano ethyl) phthalate, etc.; esters of hydroxy aromatic acids and their ether derivatives, e. g., benzyl para-hydroxy benzoate, etc.; and numerous other plasticizers.

The plasticized and unplasticized polymerization products of this invention in combination with other natural or synthetic resins have extremely wide application. They may be used in flexible or rigid diaphragms which are extremely resistant to moisture, water and solvents. They likewise find application as sealing materials for porous bodies, such as natural, cellulosic, rubber or synthetic resin sponges and the like, for matted fibrous materials, such as fabric felts, matted wood shavings or fibers, blown or spun glass threads, etc.

By means of suitable blowing agents, or by compounding with suitable extractable, granulated materials, they may be used in the preparation of sponge materials. Suitable hose and flexible tubing, highly resistant to flexing faults may be prepared either by extrusion methods or by coating fabric in tubular form. On fabrics of suitable texture, they may be used in the preparation of water protective devices, such as raincoats, shower curtains, engine hoods, or when impregnated or calendered on appropriate base materials, they can be used as replacements of high quality leather, such as in shoe tops, belts, gun holsters, friction and conveyor belting and the like. These resins, when used alone or with suitable diluents, fillers, etc., can be converted into excellent shoe soles and heels.

Inking and printing rolls of good durability likewise may be prepared from the plastic compositions of this invention. As a lamina between plates of glass, excellent safety glass can be prepared. A thin film of polyvinyl butyral type composition may be used to aid bonding between the resins and the glass.

Tire carcasses or even complete industrial tires may be prepared from these resins when combined with suitable cording. Exceptionally resistant tires may be prepared by treading the tire with either the unplasticized resin or a resin previously compounded with natural or reclaim rubber or other synthetic resins.

When compounded with the synthetic rubbers of the styrene-butadiene or acrylonitrile-butadiene type, the whole mixture, including fillers, can be co-vulcanized in the usual manner with or without added fillers. Thus, either alone or in combination with rubber, they may be used in the applications cited above and even extended to a process of bonding rubber composition directly to these resins or through the intermediate composition comprising a rubber and resin combination. In this fashion, the bonding of rubber to such materials as glass, wood, cement, metals, electrical conductors, etc. may be accomplished. In combination with unvulcanized rubber, they may be used in the construction of self-sealing gas tanks, which in addition may be lined or surface-coated with an unplasticized acrylonitrile copolymer. They also may be used to sheath such electrical insulators as polythene, polyisobutylene, butyl rubber and styrene against solvent attack.

What I claim as new and desire to secure by Letters Patent of the United States is:

The process for making a vulcanizable, flexible, rubbery product which comprises polymerizing with a peroxide catalyst a mixture consisting of, by weight, 30 parts liquid partially polymerized benzyl acrylate, 47 parts ethyl acrylate, 37 parts acrylonitrile, and 10 parts butadiene.

GAETANO F. D'ALELIO.

REFERENCES CITED

The following references are of record in the file of this patent:

UNITED STATES PATENTS

| Number | Name | Date |
| --- | --- | --- |
| 2,230,784 | Reppe | Feb. 4, 1941 |
| 2,232,515 | Arnold et al. | Feb. 18, 1941 |
| 2,271,125 | Juve | Jan. 27, 1942 |
| 2,271,384 | Arnold | Jan. 27, 1942 |
| 2,273,158 | Thomas | Feb. 17, 1942 |
| 2,384,571 | Semon | Sept. 11, 1945 |

FOREIGN PATENTS

| Number | Country | Date |
| --- | --- | --- |
| 360,822 | Great Britain | Oct. 30, 1931 |
| 456,442 | Great Britain | 1936 |
| 522,982 | Great Britain | July 2, 1940 |
| 715,961 | France | Oct. 5, 1931 |
| 114,023 | Australia | Oct. 9, 1941 |